(12) United States Patent
Ovard

(10) Patent No.: US 6,293,527 B1
(45) Date of Patent: Sep. 25, 2001

(54) SPLASH BAR FOR DIRECT CONTACT HEAT AND MASS TRANSFER METHOD AND APPARATUS

(76) Inventor: John C. Ovard, 3465 Ridgeview Dr., Santa Rosa, CA (US) 95404

( * ) Notice: Subject to any disclaimer, the term of this patent is extended or adjusted under 35 U.S.C. 154(b) by 0 days.

(21) Appl. No.: 09/550,393

(22) Filed: Apr. 14, 2000

Related U.S. Application Data

(60) Provisional application No. 60/129,739, filed on Apr. 16, 1999, now abandoned.

(51) Int. Cl.$^7$ .................................................. B01F 3/04
(52) U.S. Cl. .................... 261/111; 261/112.2; 261/113; 261/DIG. 11
(58) Field of Search .............................. 261/111, 112.1, 261/112.2, 94, 113, DIG. 11

(56) References Cited

U.S. PATENT DOCUMENTS

| | | |
|---|---|---|
| 885,230 | 4/1908 | Von Dulong . |
| 1,549,068 | 8/1925 | Dickey . |
| 2,003,271 | 5/1935 | Beimann et al. . |
| 2,485,849 | 10/1949 | Simmons . |
| 2,809,818 | 10/1957 | Munters . |
| 2,885,195 | 5/1959 | Haselden . |
| 3,243,318 | 3/1966 | Mihara et al. . |
| 3,262,682 | 7/1966 | Bredberg . |
| 3,758,088 | 9/1973 | Fordyce . |
| 3,767,176 | 10/1973 | Engalitcheff, Jr. et al. . |
| 3,804,389 | 4/1974 | Engalitcheff, Jr. et al. . |
| 4,020,130 | 4/1977 | Ovard . |
| 4,107,241 | 8/1978 | Braun . |
| 4,439,378 | 3/1984 | Ovard . |
| 4,508,552 | 4/1985 | Ovard . |
| 4,521,350 | 6/1985 | Lefevre . |
| 4,530,707 | 7/1985 | Ovard . |
| 4,557,876 | 12/1985 | Nutter . |
| 4,578,227 | 3/1986 | Ovard . |
| 4,579,694 | 4/1986 | Bradley, Jr. . |
| 4,950,430 | 8/1990 | Chen et al. . |
| 5,112,537 | 5/1992 | Kinney, Jr. . |
| 5,316,628 | 5/1994 | Collin et al. . |

FOREIGN PATENT DOCUMENTS

857642 * 12/1952 (DE) ................................. 261/112.2

* cited by examiner

Primary Examiner—C. Scott Bushey
(74) Attorney, Agent, or Firm—Gray Cary Ware & Freidenrich LLP

(57) ABSTRACT

A splash bar for direct heat and mass transfer method and apparatus are disclosed utilizing grids of elongate splash bars which bars are arranged generally vertically and parallel with one another and wherein each splash bar includes both flat and curvilinear surfaces all of which are substantially perforated with holes. In one embodiment, the splash bar has a short first curvilinear surface that extends laterally and which changes to an extended first straight surface that in turn changes to a short second curvilinear surface which extends toward the vertical downward direction. In a second embodiment, the first straight portion is shorter and the second curvilinear surface changes to a third curvilinear surface with a reverse incline which changes to a second short straight surface which in turn changes to a fourth curvilinear surface that extends towards the vertical downward direction.

19 Claims, 14 Drawing Sheets

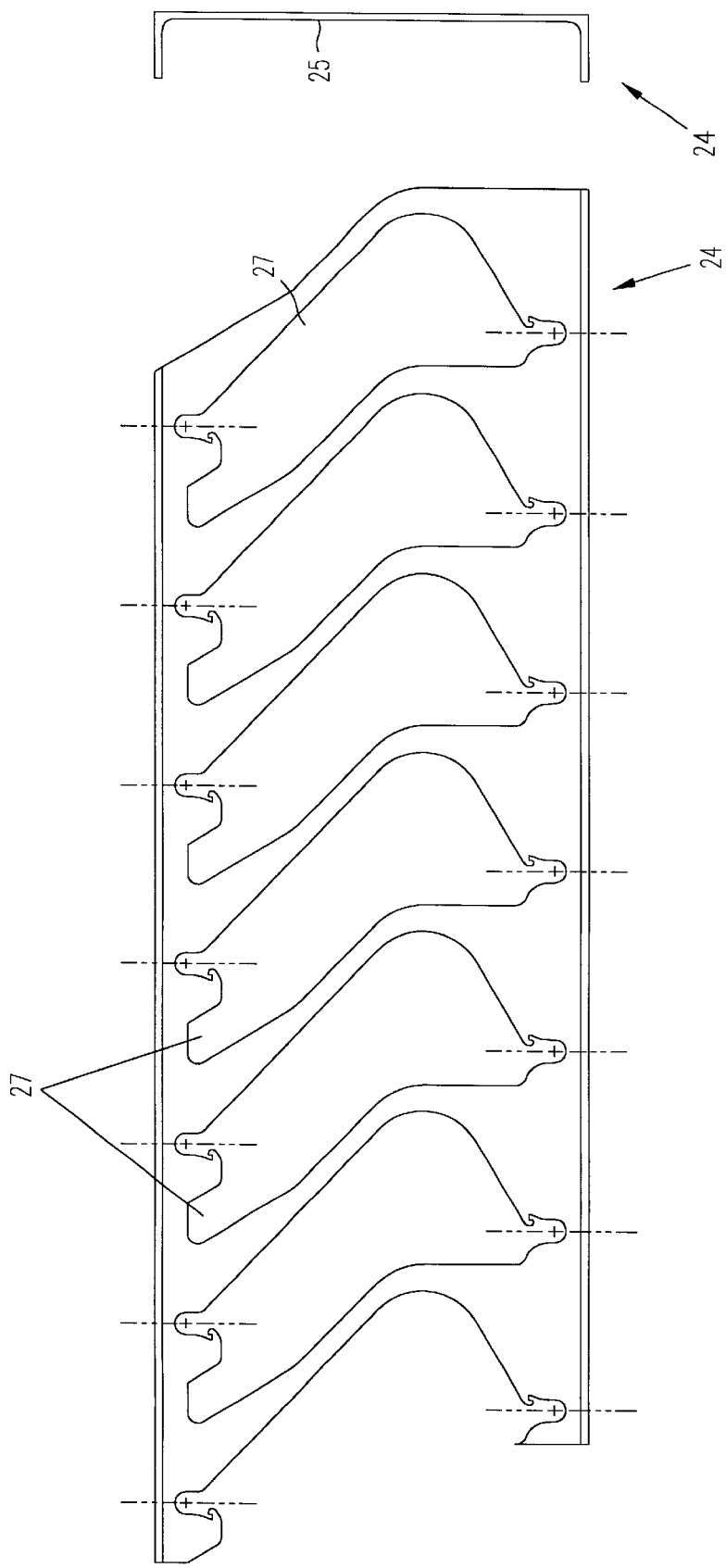

SPLASH BAR FOR DIRECT CONTACT HEAT AND MASS TRANSFER METHOD AND APPARATUS

This application is a non-provisional application claiming priority to provisional application No. 60/129,739 filed Apr. 16, 1999 now abandoned.

FIELD OF THE INVENTION

The present invention relates to an improved method and apparatus for promoting heat and mass transfer in a direct contact heat exchange apparatus designed primarily for counter current flow relationship between liquid and gas. It is also applicable for cross current flow relationship and transitional current flow relationship between liquid and gas as typically encountered in the gas inlet area of a counter flow cooling tower or other heat-mass transfer apparatus where gas flow direction transitions from cross current to counter current relationship.

BACKGROUND OF THE INVENTION

There are a number of industrial processes wherein a liquid and a gas are brought into direct contact with each other for effecting a transfer of heat and mass from one fluid to the other. The efficiency with which this direct contact heat-mass transfer occurs is primarily dependent on the amount of liquid surface area that is generated within the apparatus and comes into contact with the gas. Most of the apparatus specifically designed for this type of process employ some physical means, commonly called a heat-mass transfer media or fill assembly, whose primary purpose is to promote the generation of liquid surface area. Closely associated with this is the ability of the media to uniformly distribute the two fluids on the media surfaces and/or throughout the media section, and to assure they intimately mix while increasing fluid contact time as much as possible. This is accomplished by either promoting the generation of liquid droplets by means of a splash bar type heat-mass transfer media or by promoting the generation of thin liquid films on the surface of a cellular structure, commonly called a film type heat-mass transfer media. Clearly, this distinction relates only to the primary means of creating liquid surface area since splash type media will generate some liquid films and visa versa. The ability of the heat-mass transfer media to promote liquid-gas surface contact area and to promote intimate interaction between the two fluids and the media itself is only one key factor in the overall efficiency and applicability of the media. Of equal importance is the overall resistance to gas flow through the media that is a main factor in determining the fan energy required to move the gas through the apparatus. A given media may exhibit excellent ability to generate transfer surface area and intimate mixing and interaction between the fluids. However, if at the same time the resistance to flow and energy losses within the gas as it flows through the media is high, it will require a prohibitively high expenditure to fan energy to move the gas through the apparatus. As a consequence, the overall advantages of the media will be severely impaired or lost in practical application or otherwise limited to applications involving only small quantities of the fluids to be acted upon. To avoid or overcome this limitation, the method by which the media directs gas flow through the media must offer an aerodynamically efficient pathway for the gas thereby minimizing resistance to flow and energy losses within the gas flow due to excessive turbulence, etc. To accomplish this, the media design must minimize the projected area in a plane perpendicular to the gas flow direction and avoid surface configurations or the creation of gas flow regimes that result in restricted flow or excessive turbulence to avoid excessive energy losses within the gas. Thus, the flow of gas through the media must be aerodynamically efficient if the overall performance of the heat-mass transfer media is to be commercially successful.

In either type of heat-mass transfer media, both the liquid and gas are in a constantly changing dynamic state and individual and distinct elements of each fluid interact with adjacent elements of their own kind, elements of the other fluid and with the heat-mass transfer media in a complex way. A researcher may be able to isolate and analyze certain fundamental elements in this complex process and flow behavior and thereby gain a scientifically measurable understanding of what is important. However, there is no known precise way of evaluating the overall complex interactive behavior that actually occurs between fluids and their interaction with the heat-mass transfer media, and to predict performance superiority for a given media geometry as compared to others.

Further, it is never obvious or possible to combine known features of prior art designs to obtain an analytically predictable result. In this art, each heat transfer media design exhibits different performance characteristics which are dependent on the placement and geometry within a given design concept and method even though individual elements of the methods and means by which the design will function are clearly identifiable.

Examples of prior art splash type, counter current flow heat-mass transfer media generally describe simple, solid, rectilinear or trapezoidal shaped splash bar elements in horizontal, spaced apart relationship either assembled into grids or supported by wire hanger systems. In general, these designs exhibit significantly lower heat exchange efficiency as compared to film type media. Because of this, and higher energy costs, splash type counter current heat exchange media of the prior art have generally become obsolete.

Examples of film type media and assemblies are shown in U.S. Pat. No. 2,809,818, patented on Oct. 15, 1957 and a number of others both before and since this patent. Most of the film-type heat transfer media are composed of a plurality of thin, corrugated and specifically formed sheets. Assembled, adjacent sheets form cellular passageways where the gas and liquid may flow in counter current relationship to one another. In most configurations, the liquid flows as thin films adhering to the sheets and the gas flows uniformly filling the passageway. U.S. Pat. No. 3,262,682 illustrates one of the more effective film-type heat transfer media. All sheets are oriented and connected such that the corrugations extend at an oblique angle relative to a horizontal plane with every second layer having its corrugations oriented obliquely in the opposite direction. U.S. Pat. No. 4,950,430 is a similar, but more recent film type fill assembly example wherein the corrugated sheets are perforate. The perforations of this invention are taught as a means to generate thinner liquid films on the media surfaces and also as a means to further promote uniformity in the distribution of both liquid and gas. The corrugated sheets with the "special structures or surface treatments" which are therein described as the various perforate designs and features, are included as a primary means to enlarge and maintain the liquid contact area and to enhance the uniformity of the gas distribution. The perforations as taught in this invention act as liquid dividers, diverting the thin film liquid flow on a packing sheet around the perforations thereby aiding the horizontal and lateral spread of the liquid films. Said perforations are also taught as a means it enable liquid film flow from one side of the sheet to the other and also as a means to enable gas flow from one passage to another. In regards to gas flow through the perforations, it is important to note that in this media structure and method gas flow through the perforations will only occur if there is an inadvertent imbalance is gas flow between adjacent gas flow passages which are all of uniform size, and shape and thereby of themselves generally promote uniformity in gas flow and direction.

U.S. Pat. No. 5,316,626 also describes a film type heat-mass transfer media in the "Type I compartments." In this device all of the liquid is in film flow on perforate plate surfaces and all of the gas or vapor is forced through the perforations in the plates which are either flat or corrugated and may be placed either vertically or at an inclined angle. A more extreme example with almost identical method and operating means is found in U.S. Pat. No. 885,230 which forces all of the gas and a large portion of the liquid film on the plates to flow together through the plate perforations. Both of these prior art teachings result in extremely high resistance to gas flow and correspondingly high gas side energy losses limiting their application to very low mass flow rate processes.

U.S. Pat. No. 2,003,271 teaches a media consisting of vertically arranged members of perforate sheet metal in horizontal spaced apart relationship which are inclined to themselves with respect to the perpendicular, and to this end, may be buckled or corrugated in shape. These vertically arranged members are superposed in layers at an angle to one another and thereby create a "pervious mass" for continuously retarding and subdividing water flowing downwardly through the mass. While this arrangement provides for intimate mixing of liquid and gas, there is also a very high resistance to gas flow, thereby limiting this art to low flow applications. Further this patent relies almost exclusively on the shearing action of the sharp edges on the apertures formed by expansion of the sheet metal to subdivide the liquid and does not provide a means to extend the splash surface areas.

There are other Patents such as U.S. Pat. No. 1,549,068 and U.S. Pat. No. 3,804,389 which employ spaced apart wave forms assembled into vertically spaced apart imperforate grids where the heat-mass transfer media are designed to generate liquid surface by both splash and liquid film method in varying degrees. The emphasis in both of these patents is placed on enhancing liquid film surface development by employing simple waveforms in the grid structure and neither teaches the use of perforations for any purpose.

Among the problems associated with all of the film type media described or referred to above is their relatively higher resistance to gas flow. Even more importantly, recent experience has shown that these cellular film type designs, particularly in cooling tower applications, will plug up with dust and biological matter that are extracted from the atmospheric air and deposited on the surfaces of the passageways over time. Once this happens, film type designs become inoperable and replacement is the only practical solution. The gentle flow of liquid films in the passageways is insufficient to wash away these deposits. By contrast, splash type designs are self-cleaning as the vigorous splashing action of free falling liquid easily removes any sediment or deposits.

There are many splash bar type methods and apparatus for promoting heat-mass transfer in a direct contact heat exchange apparatus design for cross current flow relationship including U.S. Pat. No. 4,578,227 patented Mar. 25, 1986, and more recently U.S. Pat. No. 5,112,537 as well as other prior art examples referred to in these patents. Almost without exception, these devices are specifically designed for cross current flow relationship between the fluids and if applied to counter current fluid flow relationship, will result in very high gas energy losses since they all present a broad projected surface area perpendicular to the direction of gas flow. This prohibits their effective usage in counter current flow applications. The single exception is U.S. Pat. No. 3,758,088 that, if applied in the counter current liquid-gas flow relationship, would provide a fairly aerodynamically efficient gas flow regime. However, this patent teaches splash type fill assembly consisting of the splash bars wherein the members have nonplanar upwardly facing splash surface. Said members are of transversely arcuate configuration defining at least a portion of a sine wave. This configuration limits the project splash surface by the very nature of the splash bar shape. Any attempt to increase projected splash surface area in the direction of liquid flow by simply increasing the sine wave amplitude would constitute an increase in splash surface area but at the same time will increase gas flow turbulence and result in excessive energy losses in the gas flow. Further, this patent does not teach the incorporation of perforate surfaces in any form.

While the differences in splash bar designs and the various uses of perforate surfaces as found in prior art designs may appear subtle, those skilled in the art will recognize that geometric shape and relative positioning are highly significant in terms of their impact on splash effectiveness, liquid distribution and fragmentation and the gas flow regime, distribution and energy losses. These differences are magnified by the fact that a typical media assembly area contains a very large number of individual splash bar elements, each of which influences the liquid and gas dynamics and the performance of it's neighbors. Clearly much is yet to be done to obtain the ultimate functional relationship between gas and liquid in a counter current splash bar design and assembly matrix.

SUMMARY OF THE INVENTION

Broadly stated, the present invention is directed to an improved splash bar method and apparatus employing elongated splash bars, each having a combination of both flat and curvilinear surfaces, all of which are substantially perforated with holes of selected size and shape, This method and apparatus provide enhanced liquid droplet generation while concurrently directing the flow of gas in a smooth, aerodynamically efficient gas flow regime.

In both the first and second embodiments of the splash bar elements, the splash bars are assembled into grids in an open, spaced apart relationship thereby creating fluid flow passages between said splash bar elements. The cross sectional shape of the splash bars, their perforate surfaces and their spaced apart relationship as described and revealed in this disclosure, specifically establish and direct the flow direction and interactive behavior of both liquid droplets and gas streams as these two fluids flow and intermingle within the open passages between the splash bars and throughout the entire heat-mass transfer media section of the apparatus. These same features also specifically direct how both fluids interact with the splash bars themselves. This applies when the general flow direction of the two interactive fluids is either in counter current or cross current flow relationship to one another or in a transitional flow relationship between these two alternative flow regimes.

The shape and arrangement of the splash bar surface elements and the positioning of the splash bars themselves within a grid structure are arranged to provide substantial projected splash surface for falling liquid droplets. Concurrently, these droplets, and the new droplets that are generated by impaction and mechanical dispersion as herein described are redirected to similar surfaces on adjacent splash bar elements and surfaces within the same grid structure, and splash bar elements in grid structures, in vertically displaced adjacent layers.

In both the first and second embodiments, each of the splash bars has a cross section that includes near the upper end a short first curvilinear portion which extends laterally toward one adjacent bar and meets one end of an extended first straight portion. The other end of this first straight portion meets with a short second curvilinear portion which extends toward the vertical downward direction. In the second embodiment, the splash bar ends at this point. In the first embodiment, the splash bar cross section includes a short third curvilinear portion extending from the bottom of the second curvilinear portion with a reverse incline away from the one adjacent bar and meets with one end of a short second straight portion. This second straight portion is shorter than the first straight portion, and the other end of the second straight portion meets with a fourth curvilinear portion which extends toward the vertical downward direction.

The perforations also add to the droplet generation process as some of the original droplets that impinge on these surfaces are sheared and further dispersed as they pass through the perforations thereby creating a second means for generating droplet surface area. In the splash bar element of the first embodiment, a portion of the droplets that pass through the upper inclined perforate surfaces also impinge on the same splash bar a second time on the lower, reverse inclined portion on the splash bar thereby creating a third means for generating even more droplets. This does not occur with the splash bar elements of the second embodiment because it does not have a lower section with a reverse incline. However, a similar action is created to some extent by reversing incline direction of the splash bar elements in lower adjacent layers as described herein. The second embodiment offers a further advantage in that the simpler cross sectional shape creates only two directional changes in the main gas flow direction. Thus, the flat perforate surface of this embodiment may be extended beyond what is practical and efficient with the splash bar element of the first embodiment without creating excessive gas flow turbulence.

In either splash bar embodiment, the fluid passages created between the splash bars by their shape and position also create an aerodynamically efficient passage for directing gas flow in either counter current or cross current relationship to the falling liquid droplets. In the cross current flow relationship the grids are positioned such that the gas flow is parallel to the longitudinal axis of the splash bars. In either embodiment, the aerodynamically efficient gas flow directing means of the passages created by the splash bar cross sectional shape, spacing and arrangement minimizes the resistance to gas flow. The gas flow directing means thereby reduces the energy that must be expended in moving the gas through the grid assemblies within the array of grids in the heat-mass media exchange section of the tower.

Further, the media section can now extend downward into the gas intake area of the apparatus whereas prior art inventions cannot be installed in this area without creating excessively high resistance to gas flow in this transitional gas flow region. By installing the splash bar elements in the grid structure of the instant invention in this transitional gas flow region, the heat-mass transfer performance of the entire apparatus will be improved. Further, a modified version of the cross bar elements as described herein, when properly placed, will act as turning vanes in this transitional flow region thereby effectively redirecting the gas flow to the desired vertical counter current flow relationship and reducing the gas flow energy losses in this transitional flow region within the apparatus.

With either splash bar element embodiment of this invention, operating in counter current fluid flow relationship, there is an the intended gas flow imbalance due to the cross sectional shape of the splash bar elements between the upper and lower surfaces of said individual splash bar elements. Gas flowing around these elements will result in a pressure differential between the upper and lower surfaces of said splash bar elements that will cause both turbulence and a secondary portion of the flowing gas to flow through the perforations which will provide even more turbulence and intimate mixing between a portion of the gas and the liquid droplets both above and below the splash bar element surfaces. Those skilled in the art will immediately recognize that this new invention offers substantial advantages over the prior art in terms of creating a highly effective liquid droplet generation ability than was heretofore known in a splash type heat-mass exchange media. It will also be readily recognized that this invention concurrently creates minimal gas side energy losses and resistance to gas flow and promotes more intimate mixing between the two fluids. Both the means and methods to accomplish these improvements are envisioned within the scope and intent of this invention.

BRIEF DESCRIPTION OF THE DRAWINGS

FIG. 8 is a longitudinal view of a typical cross bar element that firmly holds the splash bar elements of the first embodiment in position and in spaced apart relationship in a assembled grid as shown on FIG. 3.

FIG. 9 is a cross sectional view of said cross bar element.

DESCRIPTION OF THE FIRST EMBODIMENT

Figure 1:
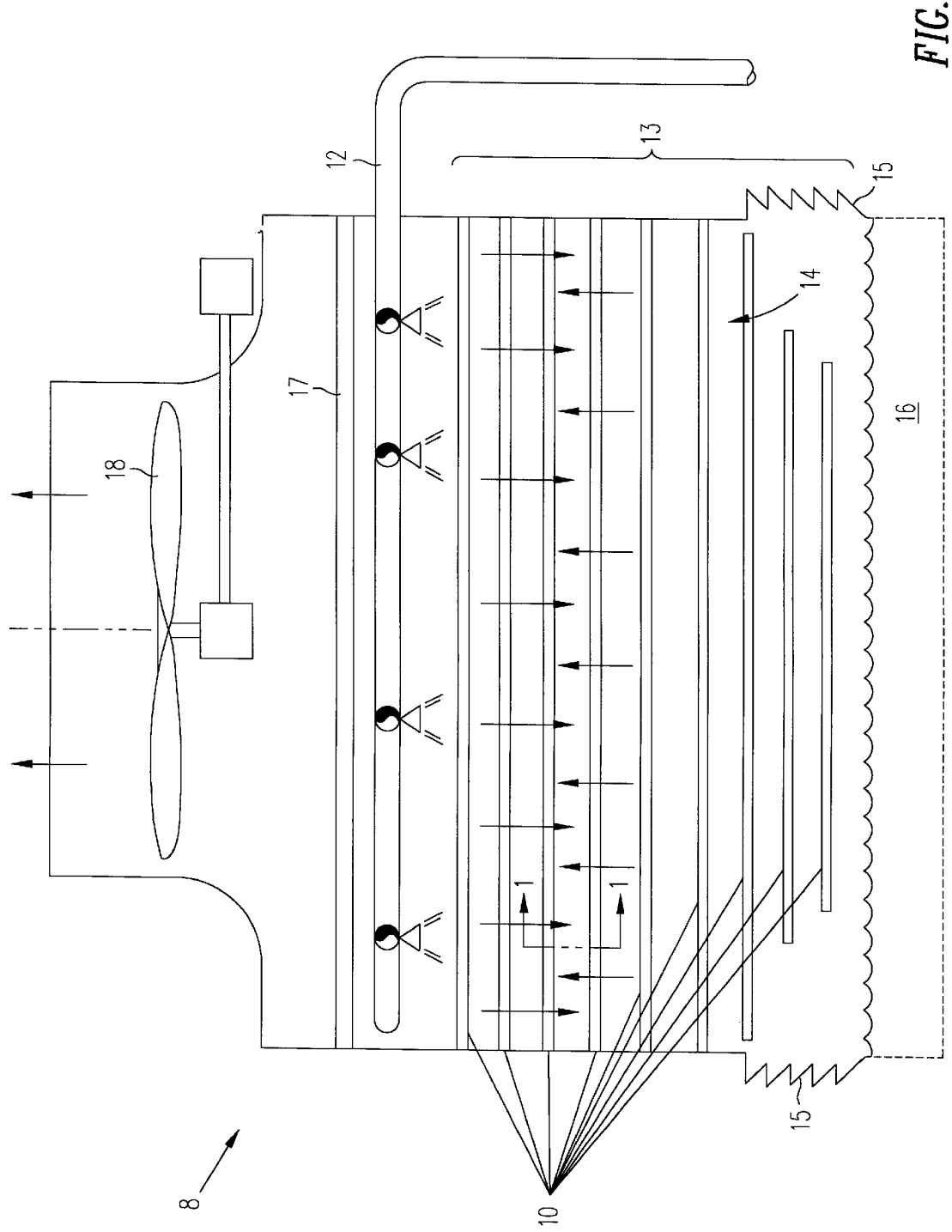
FIG. 1 is a side elevational sectional view of a typical counter current, induced draft cooling tower with the general location and positioning of splash bars in grid form in accordance with the present invention.
Figure 3:
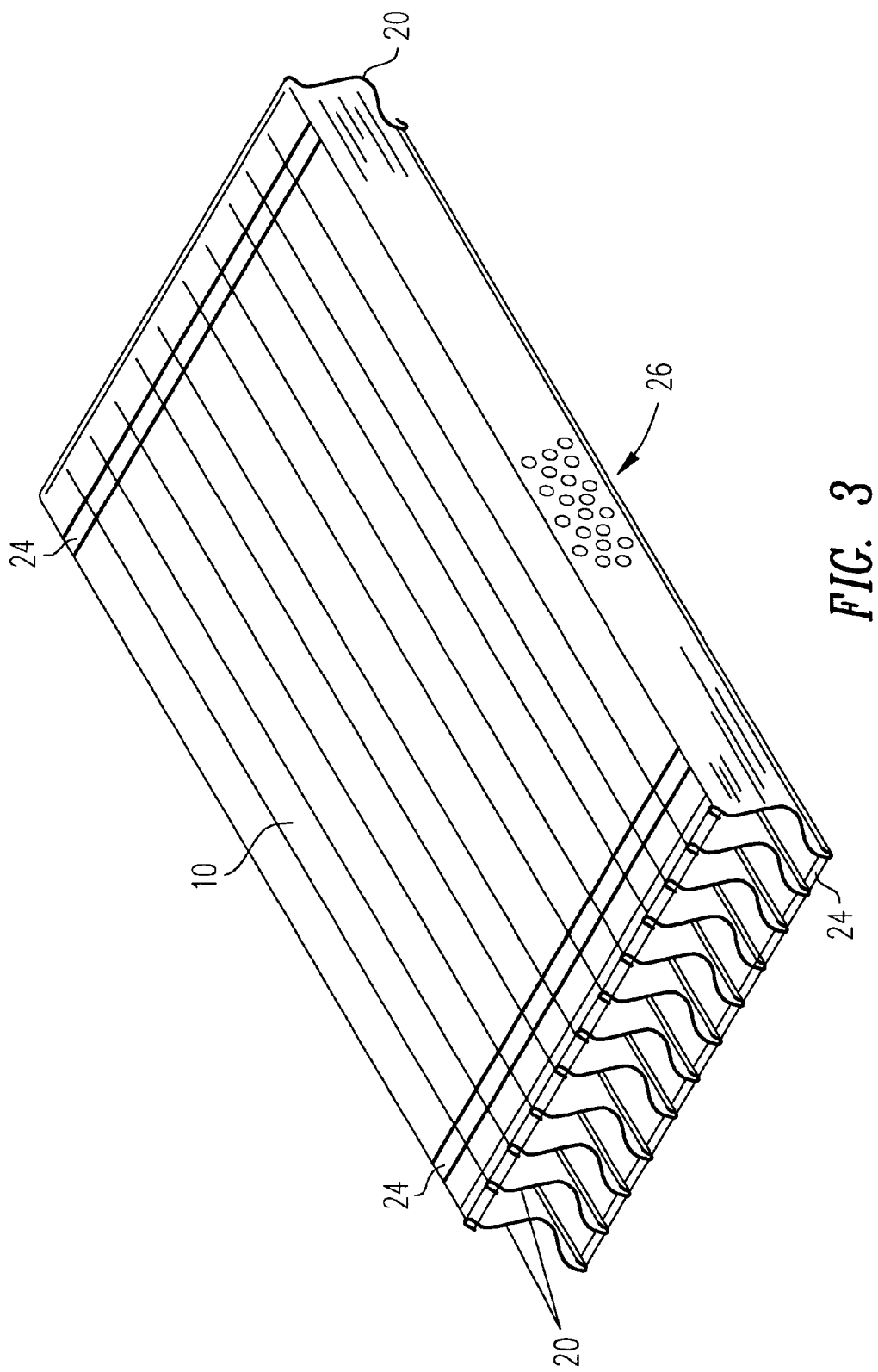
FIG. 3 is perspective view of a grid of splash bars of the first embodiment schematically illustrating the perforations in just a portion of the edge splash bar.
Figure 4:
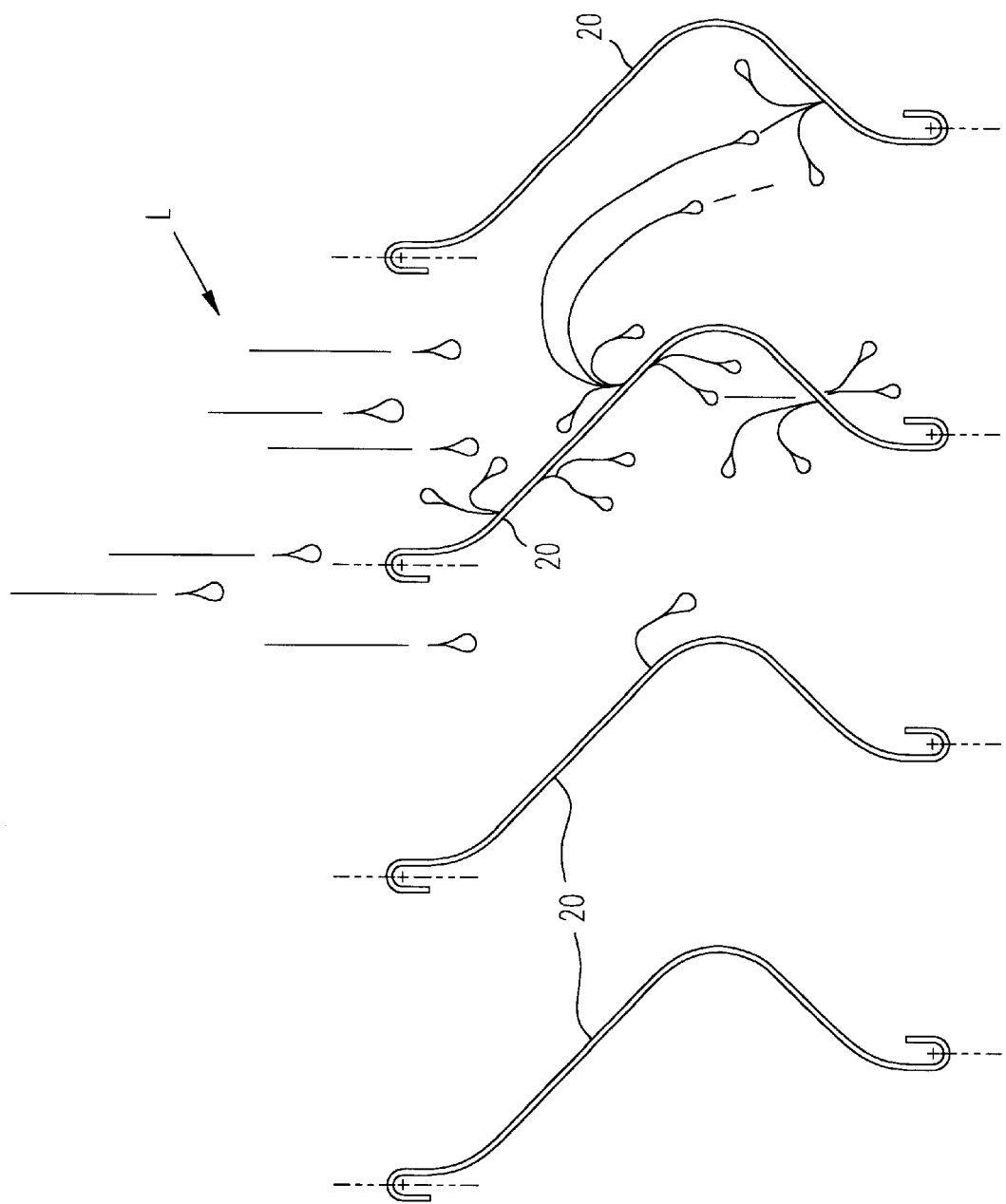
FIG. 4 is a schematic side elevational illustration of the first embodiment of the splash bar of the present invention illustrating various methods by which liquid droplets are generated by splashing action and mechanical dispersion methods of generating additional droplets as the initial droplets interact with the splash bar.
Figure 5:
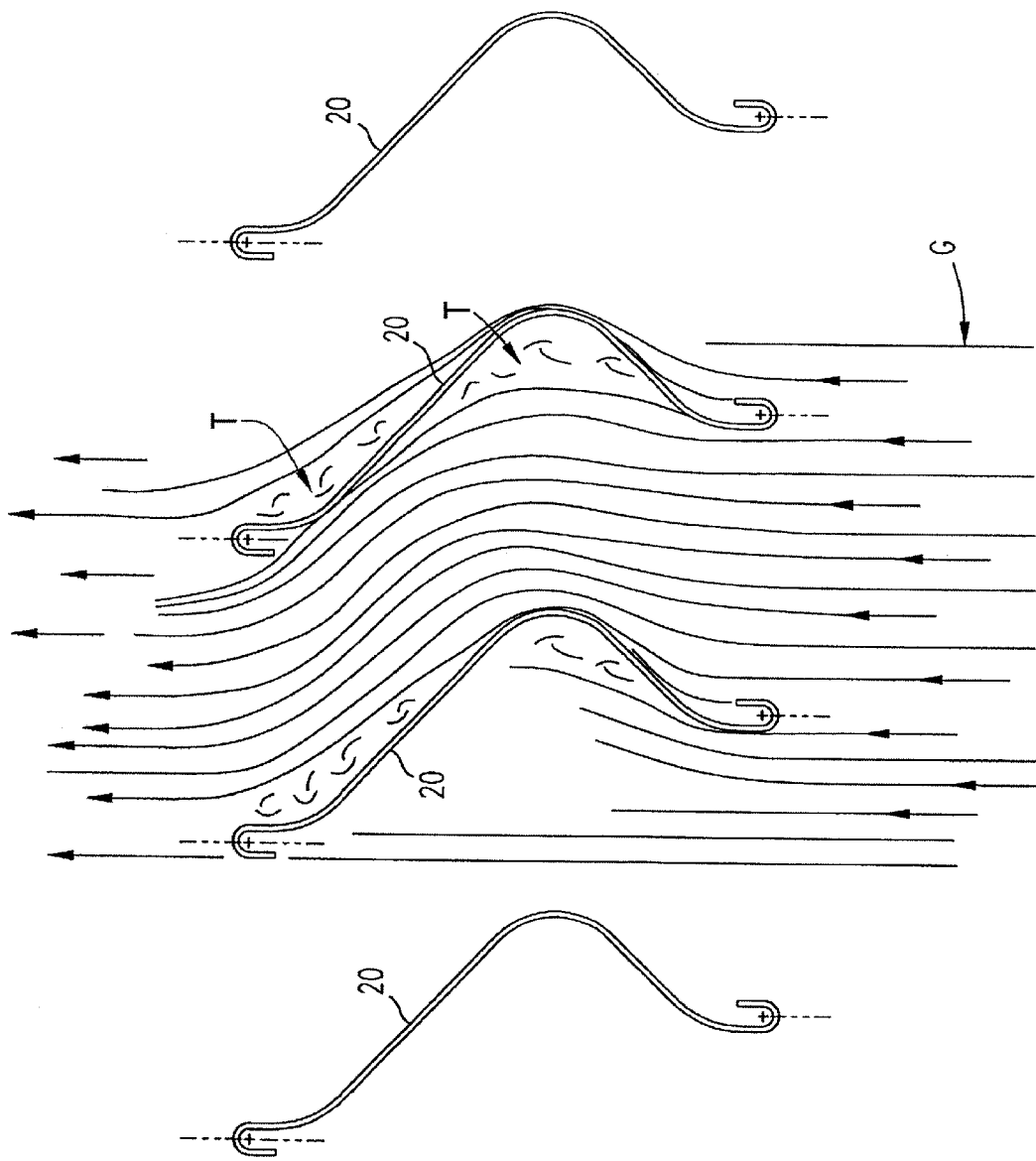
FIG. 5 is a view similar to FIG. 4, but generally demonstrating the various methods and means by which gas flow efficiently moves through the passageways. A superposition of FIGS. 4 and 5 demonstrates the full scope and intent of the splash bars of the first embodiment of this invention as they specifically direct the flow and interactive behavior of both fluids and how they interact with the splash bars elements themselves.

Referring now to the drawings, FIG. 1 illustrates a cross sectional view of a typical counter current, induced draft cooling tower 8 with a series of vertically spaced apart splash bar grids 10 held together by cross bar elements 24 and located in the heat-mass transfer exchange section 13 directly below a liquid spray system 12. Said splash bar grids 10 extend downward into the gas intake section 14 immediately inward of the gas intake louvers 15. In this intake transitional flow region where gas flow direction changes from horizontal direction to the vertical direction, the cross bar elements 24 which are shown in FIGS. 3, 8 and 9 of splash bar grids 10 can be opened up and curved to act as efficient turning vanes. These turning vanes then redirect gas flow upwardly through the splash bar grids thereby reducing gas flow energy losses in establishing true counter current relationship to a liquid as it flows and splashes downward through the splash bar grids 10 to a water collection basin 16. Mist eliminators 17 and an induced draft fan 18 are positioned above the liquid spray system 12 as shown. The fan draws the gas through the intake louvers 15, through the transitional flow region 14 where gas is redirected vertically and upward through the splash bar grids 10 in the heat-mass exchange section 13, through the mist eliminators 17 and finally through the fan.

Figure 2:
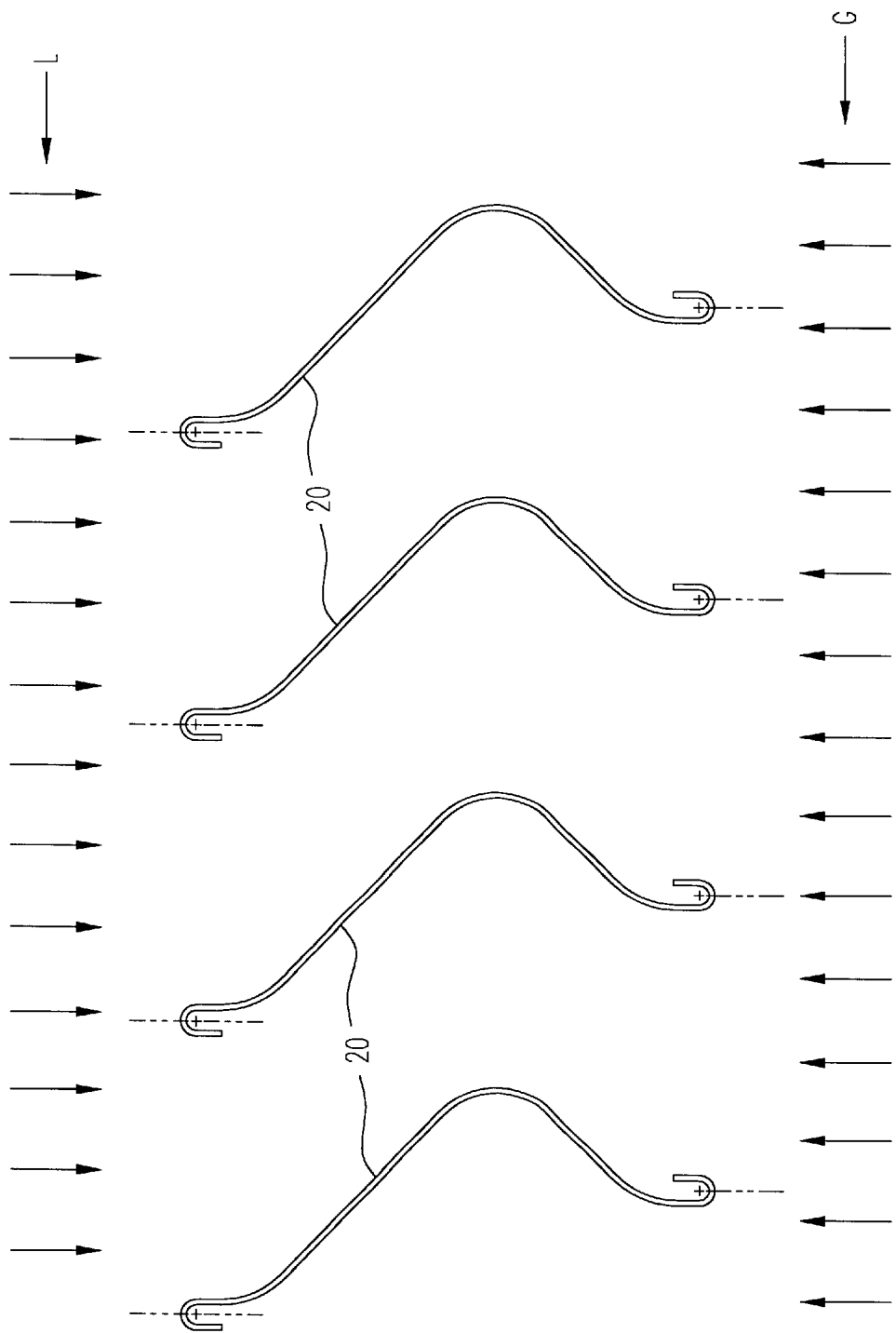
FIG. 2 is a schematic side elevational view of a plurality of splash bars illustrating a typical arrangement of counter current flow operation in accordance with the first embodiment of the present invention.

Referring now to FIGS. 2 and 3, the splash bar elements 20 are placed horizontally in open spaced apart relationship as shown in FIG. 2, for counter flow passage of water or liquid indicated as L and air or gas indicated as G.

Figure 10:
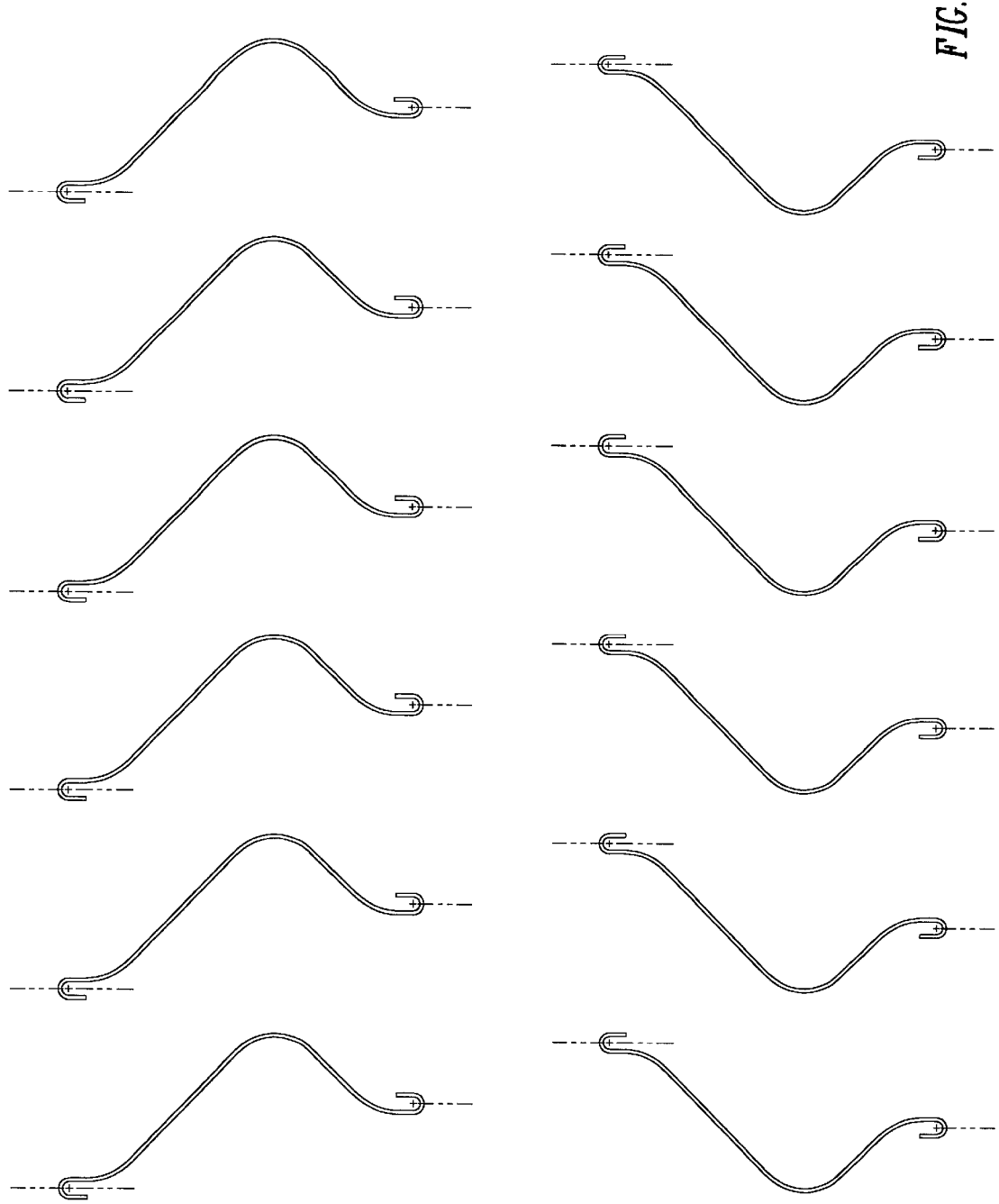
FIG. 10 is a cross sectional elevational view showing the arrangement and positional relationship of the splash bar elements of the first embodiment for two adjacent layers of grids in FIG. 1 along line 1—1 in the direction of the arrows.

Typically, the splash bar elements 20 are assembled into grids 10 and held in position by cross bar elements 24 as shown in FIG. 3. Said cross bar elements 24 shown in FIGS. 8 and 9 are spaced apart and placed at either longitudinal extreme of the splash bar elements and at other intermediate longitudinally spaced positions as desired. Assembled grids 10 are positioned in spaced apart and off-set relationship relative to those above and below and with the inclined surfaces of the bar elements alternately reversed in direction from grid layer to adjacent grid layer. This is shown in FIG. 10 within the heat-mass transfer exchange section 13 and air intake section 14 as illustrated in FIG. 1 of a cooling tower or similar device.

Figure 6:
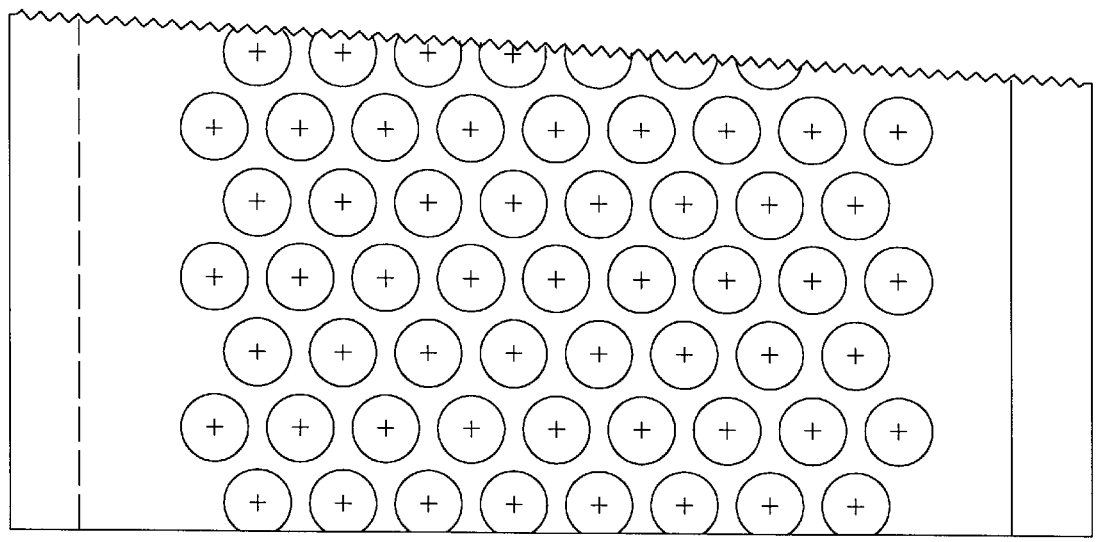
FIG. 6 is a plane, foreshortened flattened view of a splash bar fabrication of the first embodiment shown in FIGS. 2–10 in accordance with the present invention with the alignment and center lines of the perforations illustrated in a portion of the view.
Figure 7:
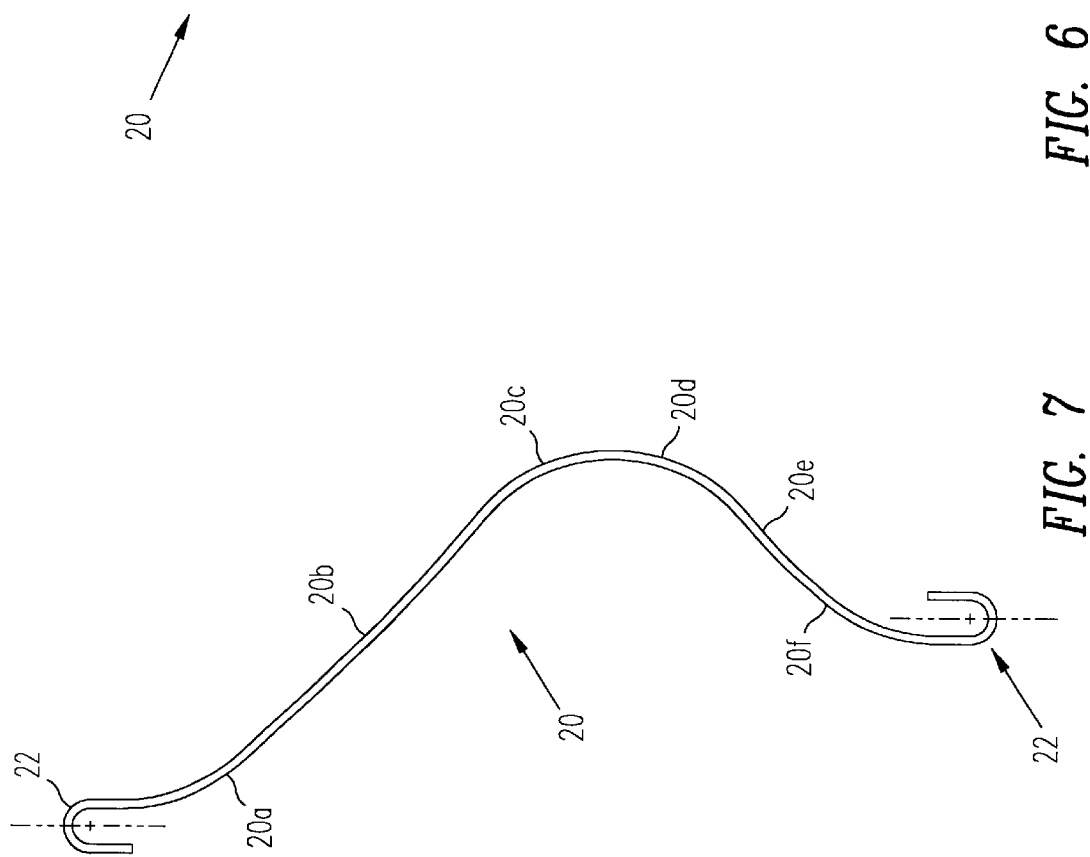
FIG. 7 is a side elevational view of a portion of the flattened structure shown in FIG. 6 but illustrating the splash bar in final shaped form.

The first embodiment of the splash bars 20 of the present invention is illustrated in FIGS. 6 and 7, showing that the hole 26 pattern repeats in staggered, offset relationship for the full length of each splash bar 20. FIG. 7 illustrates the perforations 26 along one line passing through a series of perforations. The upper and lower lateral edges of each splash bar 20 have a hook structure 22 designed to interlock with the lateral extremes of the punch-out 27 in the web section 25 of crossbar element 24 as shown in FIG. 8.

Referring now to FIGS. 2 and 7, the splash bars 20 of the first embodiment have a cross section that includes near the upper end a short first curvilinear portion 20a which extends laterally toward one adjacent bar and meets with one end of an extended first straight portion 20b. The other end of the straight portion 20b meets with a short second curvilinear portion 20c which curves back toward the vertical. This second curvilinear portion continues as a third curvilinear portion 20d with a reverse incline from the second curvilinear portion to meet with a second straight portion 20e which is shorter than the straight portion 20b. The other end of the second straight portion 20e meets with a fourth curvilinear portion 20f having a reverse incline to that of the third curvilinear portion 20d to extend to the vertical down direction.

The second embodiment of the splash bars elements 30 of the present invention is similarly illustrated in FIGS. 11 through 17. Elements 30 may be directly substituted for the splash bar elements 20 as described in the first embodiment of this invention and with suitable changes to the details of the punch-out 27 of cross bar element 24.

Figure 11:
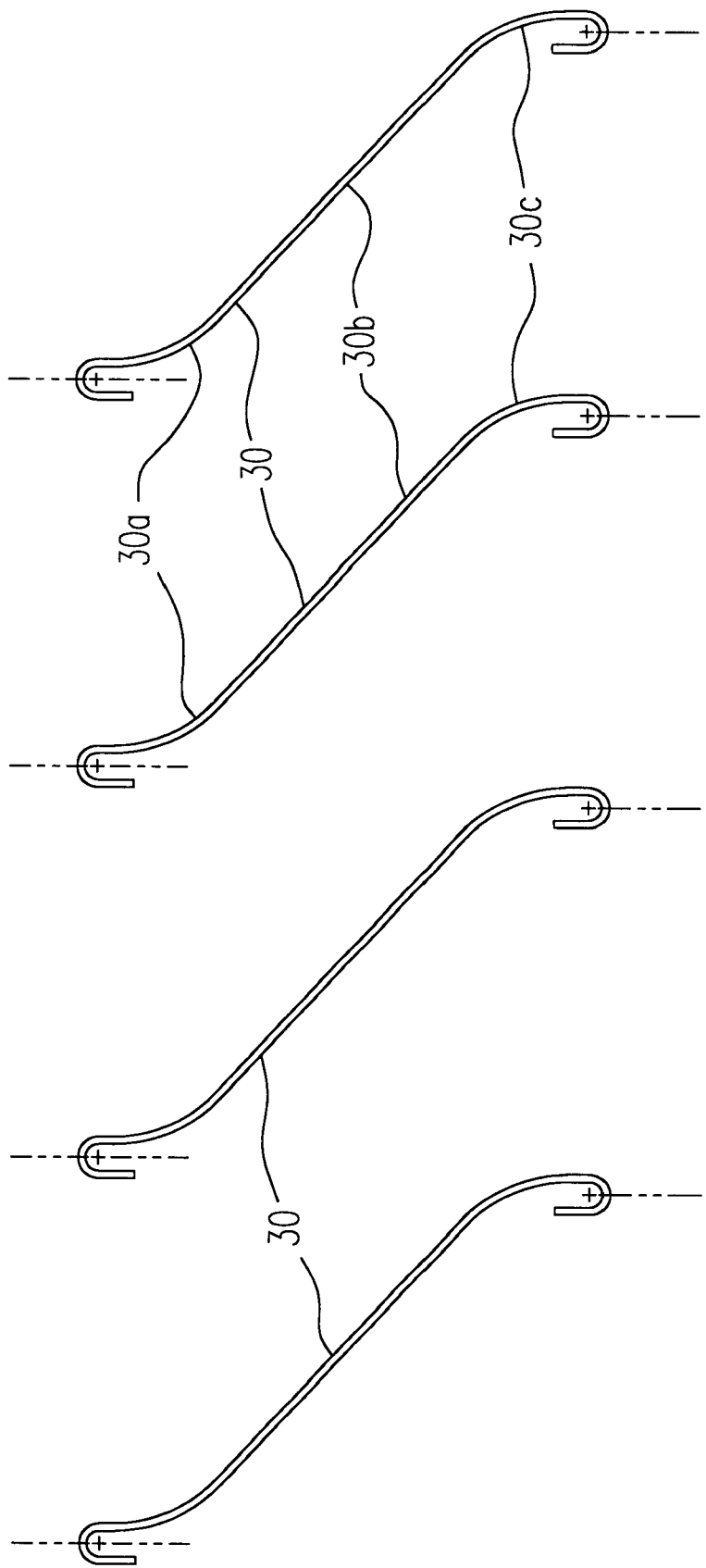
FIG. 11 is a cross sectional view of a plurality of splash bars illustrating the second embodiment of the splash bar element 30 of the present invention.
Figure 12:
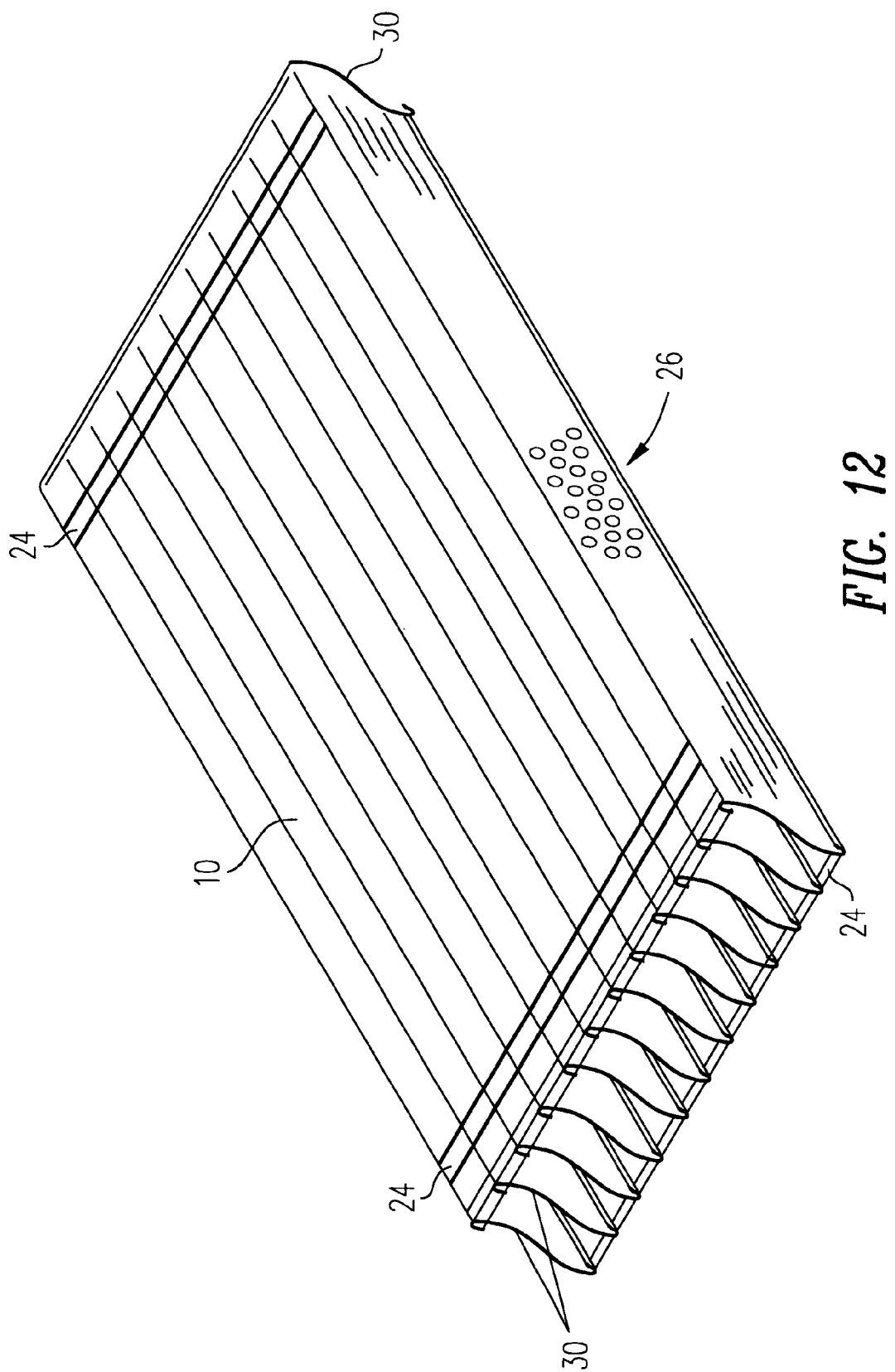
FIG. 12 is a perspective view of a grid employing splash bars of the second embodiment.
Figure 13:
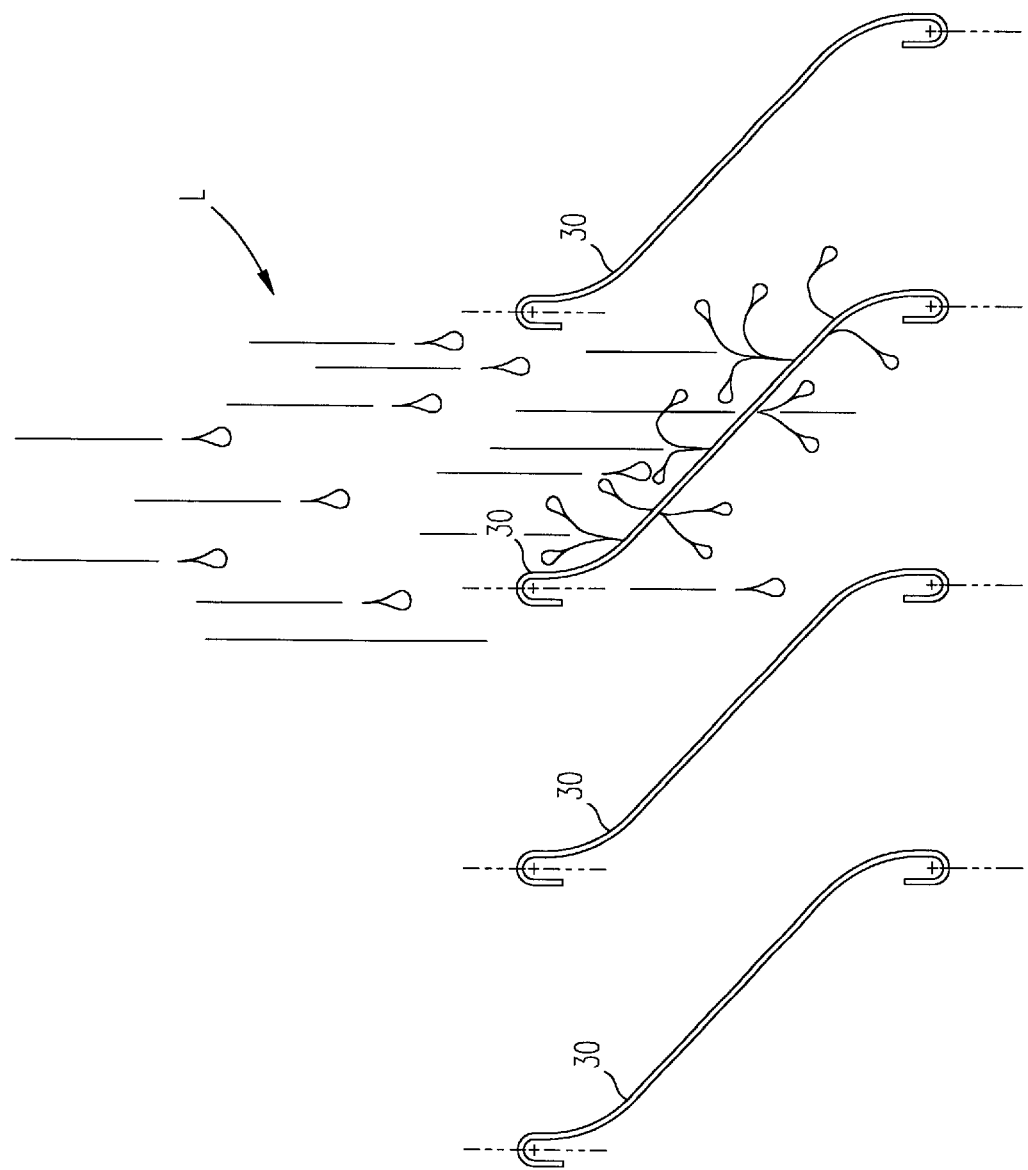
FIG. 13 is a schematic side elevational illustration of the second embodiment of the splash bar elements of the present invention illustrating various methods by which liquid droplets are generated by splashing action and mechanical dispersion methods of generating additional droplets as the initial droplets interact with the splash bar.
Figure 14:
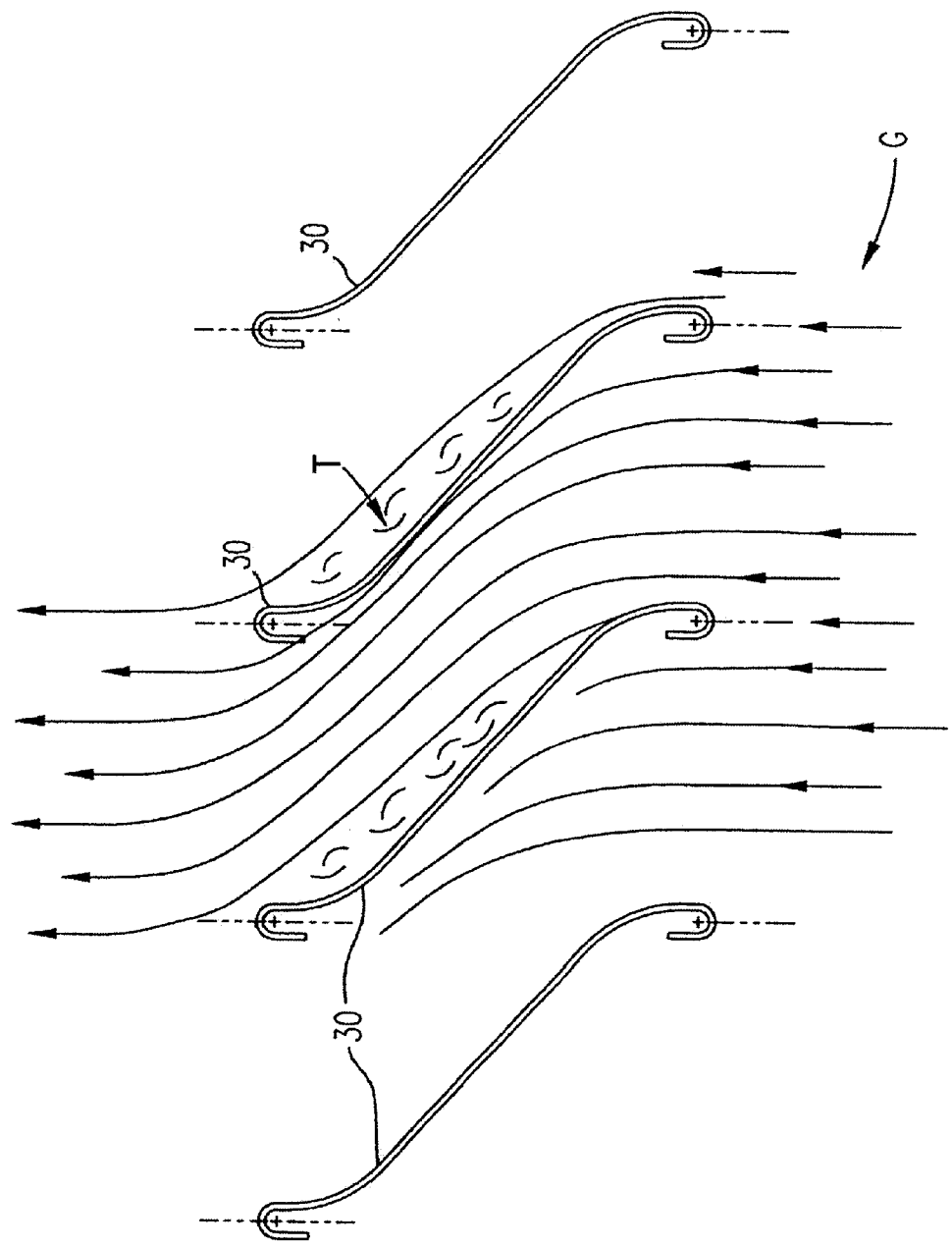
FIG. 14 is a view similar to FIG. 13, but generally demonstrating the various methods and means by which gas flow efficiently moves through the passageways. A superposition of FIGS. 13 and 14 demonstrates the full scope and intent of the splash bar elements of the second embodiment of this invention as they specifically direct the flow and interactive behavior of both fluids and how they interact with the splash bar elements themselves.
Figure 15:
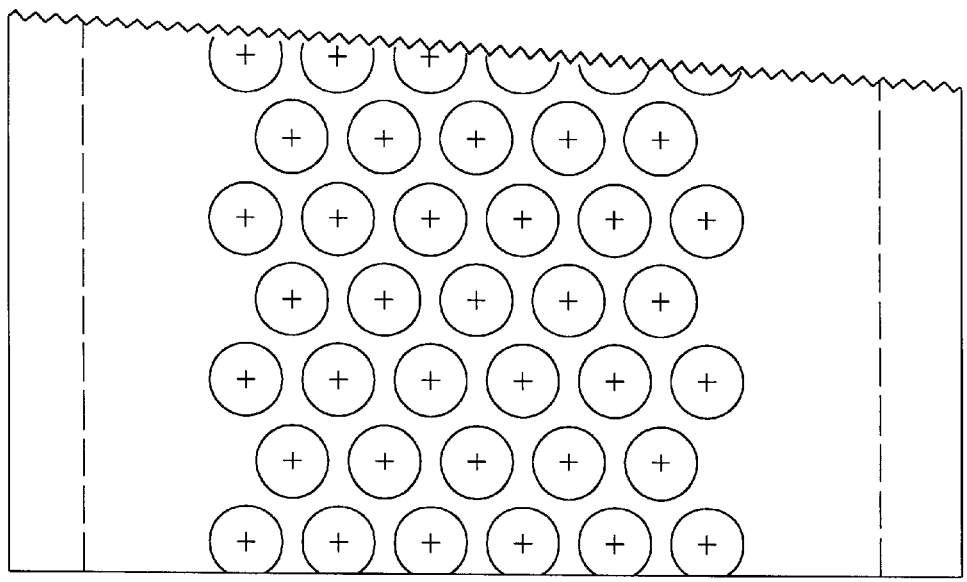
FIG. 15 is a plane foreshortened flattened view of splash bar element fabrication of the second embodiment in accordance with the present invention with the alignment and center lines of the perforations illustrated in a portion of the view.
Figure 16:
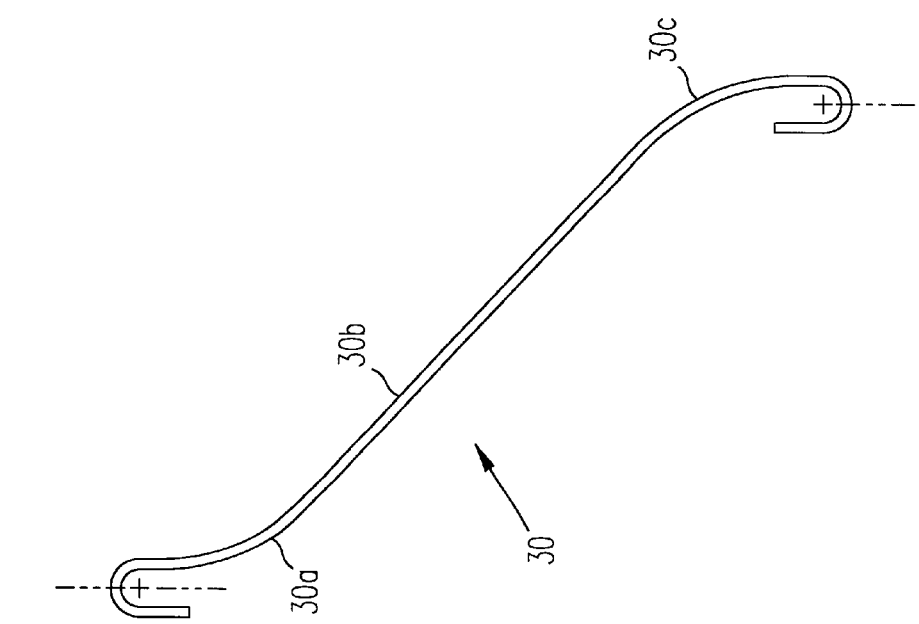
FIG. 16 is a side elevational view of a portion of the flattened structure shown in FIG. 15 but illustrating the splash bar in final shaped form.
Figure 17:
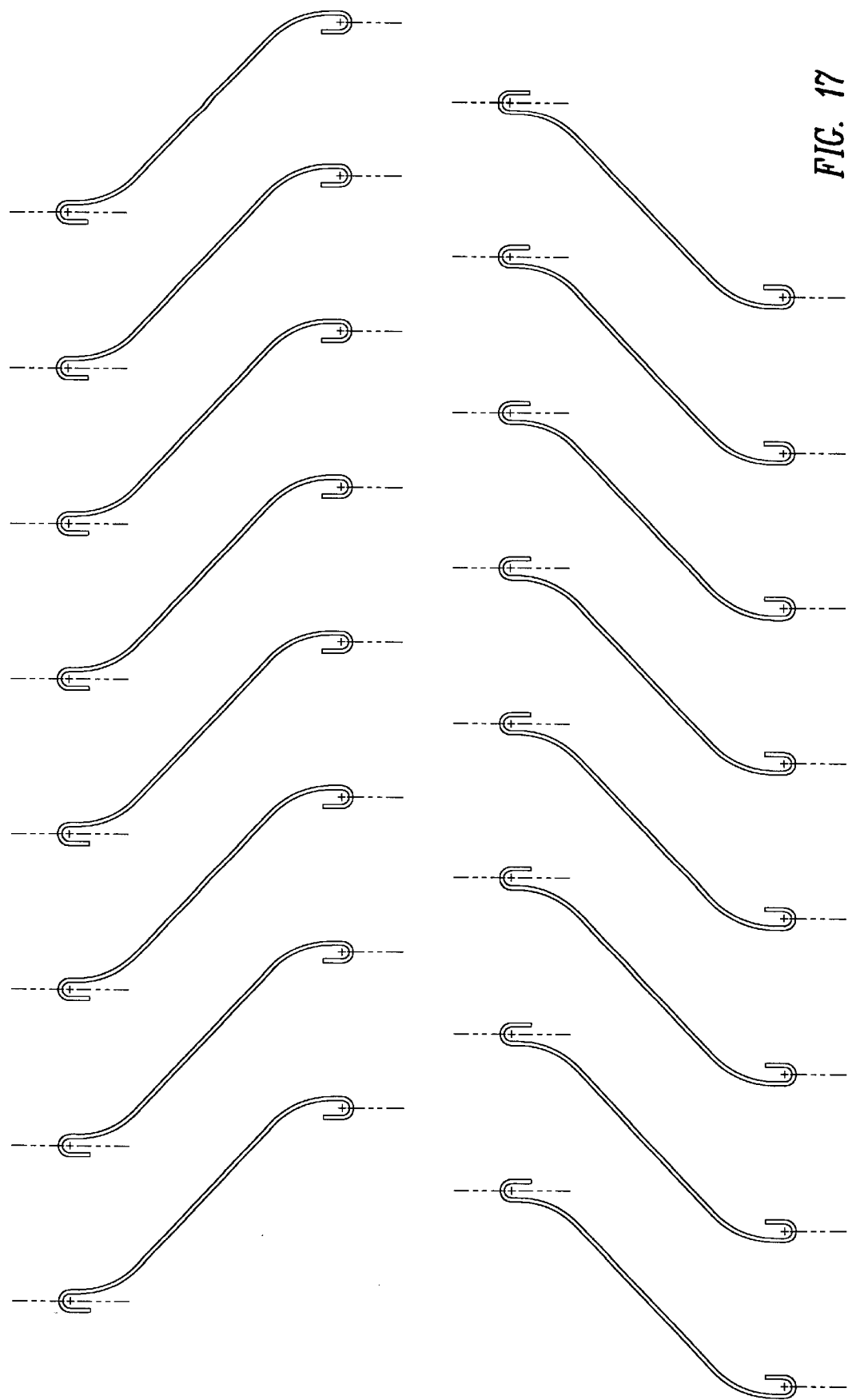
FIG. 17 is a cross sectional elevational view showing the arrangement and positional relationship of the splash bar elements of the second embodiment in two adjacent layers of grids in FIG. 1 along line 1—1 in the direction of the arrows.

Referring now to FIGS. 11 and 16, the splash bars of the second embodiment are like the upper portion of the splash bars at the first embodiment and include the first curvilinear portion 30a, the extended straight portion 30b and the second curvilinear portion 30c. Splash bar elements 30 do not include the reverse incline third curvilinear portion 20d, the second straight portion 20e and the fourth curvilinear portion 20f of the first embodiment. In both embodiments, the first straight portions 20b and 30b make an angle of no more than substantially 450 with the vertical. In the first embodiment, the second straight portion 20e makes the same angle with the vertical as the first straight portion 20b.

The use of perforate surfaces in all the prior art film type heat-mass transfer media as described above, is contrary to the purpose, method, and intent of the perforate surfaces in the splash type media of the instant invention. The perforations in the splash bar elements of the instant invention act as a means to generate additional new droplets. As falling liquid droplets impinge on the perforate surfaces, they either splash on the imperforate areas of the surfaces or, as droplets, are sheared and dispersed into new and smaller droplets by mechanical means as they interact with sections of the solid/perforate surface areas. Liquid droplets are forced to fragment as they pass through perforations by momentum and impaction forces as individual falling droplets impact the splash bar. The instant invention also creates a purposeful and aerodynamically efficient gas side flow regime due to the shape and positioning of the splash bar elements as described herein. This art also teaches the creation of an intentional gas side pressure differential between the upper and lower surfaces of an individual splash bar elements and turbulence T as the gas flow is forced to change direction by the shape and location said splash bars. This pressure differential induces a specific quantity of secondary gas flow through the perforations, which results in more turbulence and intimate mixing of liquid and gas while at the same time creating additional liquid fragmentation as described above. Further, this secondary gas flow is of minor significance in terms of energy losses since the secondary gas flow through the perforations is small as compared to the flow of the main body of gas.

The preferred materials and methods for producing either of the splash bar elements 20 or 30 and the cross bar elements 24 of the instant invention are readily accomplished by injection molding or extruding plastic materials. Both the splash bars 20 and the cross bar elements 24 which can be assembled into grid like structure 10. However, the elements of this invention and the methods and materials to produce them are not limited to plastics and applies to any formable material or process. Further, assembly into grids is not a requirement as the splash bar elements 20 or 30, as described herein, can also be supported and held in position by wire grids and/or other types of suspension systems. Any support system that holds either splash bar elements 20 or 30 in proper spaced apart relationship is also within the scope and intent of this invention.

This invention is primarily intended to provide performance advantages in direct contact heat-mass transfer devices where the liquid and gas fluid flows are in counter current relationship to each other. The most obvious application is in counter current water cooling towers where the individual splash bar elements 20 or 30 structured in assembled grids 10, as described herein, are placed in spaced apart, horizontal layers in the heat exchange media section of the cooling tower or similar device. This invention is not limited to this specific application and it will be clear to those skilled in the art that it applies equally well to any similar direct contact heat-mass transfer apparatus where either the cross or counter current flow relationship between the two interactive fluids exists.

In both splash bar embodiments of the present invention, the perforations in the splash bars are shown as circular holes punched perpendicular to the lateral axis of the profile cross section in the flattened position. However it is clear that perforations of other shapes, i.e., triangular, trapezoidal, elliptical, etc., are equally applicable and within the intent and scope of this invention. The ratio of open space produced by the perforations 26 to the total outlined area of the splash bars 20 and 30 is preferably in the range of 0.125 to 0.500.

What I claim is:

1. A splash bar apparatus comprising:
    at least a plurality of spaced apart splash bars arranged generally vertically and parallel with one another for contact heat and mass transfer between liquid and gas with the liquid directed substantially vertically downward over and through said plurality of bars,
    each of said splash bars including both flat and curvilinear surfaces all of which are substantially perforated with holes,
    both said flat and curvilinear perforated surfaces providing substantial projected splash surfaces from the vertical for falling liquid droplets and which redirect those droplets and generate new droplets by impact and mechanical dispersion to similar surfaces on adjacent splash bars,
    each of said bars has a cross section that includes near the upper end a short first curvilinear portion which extends laterally toward one adjacent bar and meets one end of an extended first straight portion the other end of which meets with a short second curvilinear portion which extends toward the vertical downward direction.

2. The apparatus of claim 1 including means for mounting said bars adjacent said first and second curvilinear portions into a grid.

3. The apparatus of claim 2 wherein said mounting means includes hook portions as part of the cross section of said bars at the top of said first curvilinear portion and at the bottom of said second curvilinear portion.

4. The apparatus of claim 1 wherein said first straight portion of said bar cross section makes an angle of no more than substantially 45° with the vertical.

5. The apparatus of claim 2 including a plurality of said grids positioned vertically spaced apart from one another and wherein the lateral extension of the splash bars in adjacent grids are in opposite directions.

6. The apparatus of claim 5 including said plurality of said grids positioned in a counter current, induced draft cooling tower directly below a liquid spray system.

7. The apparatus of claim 6 including at least one of said grids in the transitional flow gas intake portion of said cooling tower.

8. The apparatus of claim 1 wherein said splash bar cross section includes a short third curvilinear portion extending from the bottom of said second curvilinear portion and with a reverse incline away from said one adjacent bar and meets with one end of a second straight portion shorter than the first straight portion, the other end of said second straight portion meeting with a fourth curvilinear portion which extends toward the vertical downward direction.

9. The apparatus of claim 8 including means for mounting said bars adjacent said first and fourth curvilinear portions into a grid.

10. The apparatus of claim 9 wherein said mounting means includes hook portions as part of the cross section of said bars at the top of said first curvilinear portion and at the bottom of said fourth curvilinear portion.

11. The apparatus of claim 8 wherein said first and second straight portions of said bar cross section make an angle of no more than substantially 45° with the vertical.

12. The apparatus of claim 8 including means for mounting said bars adjacent said first and fourth curvilinear portions into a grid.

13. The apparatus of claim 12 wherein said mounting means includes hook portions as part of the cross section of said bars at the top of said first curvilinear portion and at the bottom of said fourth curvilinear portion.

14. The apparatus of claim 8 wherein said first straight portion of said bar cross section makes an angle of no more than substantially 45° with the vertical.

15. The apparatus of claim 12 including a plurality of said grids positioned vertically spaced apart from one another and wherein the lateral extension of the splash bars in adjacent grids are in opposite directions.

16. The apparatus of claim 15 including said plurality of said grids positioned in a counter current, induced draft cooling tower directly below a liquid spray system.

17. The apparatus of claim 16 including at least one of said grids in the transitional flow gas intake portion of said cooling tower.

18. The method of transferring heat between a gas and a liquid through a grid of splash bars by flowing the liquid in droplet form down through the grid of splash bars and the gas up through the grid of splash bars, creating droplets of liquids by bouncing droplets off the bars, flowing the liquid across the bars to perforations and shearing and dispensing new droplets off the bars at the perforations, directing the flow of liquid on a curvilinear surface lateral of one bar toward another bar, then over one extended flat surface and then over another curvilinear surface toward the vertical downward direction.

19. The method of claim 18 including directing the flow of liquid from said other curvilinear surface in a reverse incline over a third curvilinear surface then over another flat surface and finally over a fourth curvilinear surface and toward the vertical downward direction.

* * * * *